United States Patent [19]
Gallo et al.

[11] Patent Number: 5,716,257
[45] Date of Patent: Feb. 10, 1998

[54] METHOD OF HOLDING AN ARTICLE DURING MANUFACTURE

[75] Inventors: Ernest Gallo, Anaheim Hills; Terrance E. Wick, Rancho Cucamonga; Francisco M. Nuño, Alta Loma, all of Calif.

[73] Assignee: Minnesota Mining & Manufacturing Co., St. Paul, Minn.

[21] Appl. No.: 512,715

[22] Filed: Aug. 8, 1995

[51] Int. Cl.$^6$ .................. B24C 1/04; B24C 3/32
[52] U.S. Cl. .................. 451/38; 451/76; 451/82; 451/29
[58] Field of Search .................. 451/82, 89, 78, 451/77, 76, 102, 365, 381, 460, 401, 84, 29, 339, 364; 269/7, 13, 14, 287, 286

[56] References Cited

U.S. PATENT DOCUMENTS

| | | | |
|---|---|---|---|
| 955,471 | 4/1910 | Motz | 451/89 |
| 1,875,994 | 9/1932 | Davis | 451/102 |
| 2,274,020 | 2/1942 | Weightman et al. | 248/140 |
| 2,713,720 | 7/1955 | Johnson | 32/14 |
| 3,146,550 | 9/1964 | Millhiser et al. | 451/102 |
| 4,243,386 | 1/1981 | Kawaguchi | 433/9 |
| 5,393,486 | 2/1995 | Eckert et al. | 419/66 |
| 5,395,237 | 3/1995 | Pospisil et al. | 433/8 |
| 5,441,409 | 8/1995 | Tuneberg | 433/23 |

FOREIGN PATENT DOCUMENTS

| | | | |
|---|---|---|---|
| 2 370 542 | 6/1978 | France . | |
| 2 631 572 | 11/1989 | France . | |
| 1 752 019 | 8/1971 | Germany . | |
| 2 037 044 | 2/1972 | Germany . | |
| 0 283 263 | 10/1990 | Germany | 269/7 |
| WO 94/16639 | 4/1994 | WIPO . | |

OTHER PUBLICATIONS

European Search Report.

*Primary Examiner*—Robert A. Rose
*Attorney, Agent, or Firm*—Gary L. Griswold; Walter N. Kirn; James D. Christoff

[57] ABSTRACT

An article is held in a complementally-shaped receptacle of a resilient holder while a process operation is carried out on a surface of the article. After the process operation has been completed, the holder is bent in order to facilitate release of the article from the receptacle. The method is particularly useful for performing a process operation such as sandblasting, etching or otherwise treating an inner surface of a hollow article such as an orthodontic band or dental crown while a portion of the holder masks and thus protects its outer surface.

23 Claims, 3 Drawing Sheets

METHOD OF HOLDING AN ARTICLE DURING MANUFACTURE

BACKGROUND OF THE INVENTION

1. Field of the Invention

This invention broadly relates to a method of holding an article while carrying out a process operation on a surface of the article. One aspect of the invention specifically relates to a method of coating, sandblasting or otherwise treating an inner surface of a hollow article such as an orthodontic band or dental crown.

2. Description of the Related Art

Certain articles are sometimes grasped by a fixture, jig or other holding device while subjected to a processing operation during the course of their manufacture. The processing operation may comprise one or more process steps that are carried out on a surface of the article, such as coating, painting, priming, etching, treating or roughening the surface. In some cases, the article is hollow and the processing operation is carried out on an inner surface.

One example of a hollow article is an orthodontic band that is placed around a selected tooth during orthodontic treatment. Such a band provides an external mounting surface that can be brazed or welded to other orthodontic appliances such as brackets or buccal tubes. It is intended that the band remains securely connected to the tooth during the course of treatment in order to provide a stable mounting surface for the bracket or buccal tube. Typically, such bands are made of a metallic material such as stainless steel.

Orthodontic bands are available in a variety of shapes and sizes so that a certain band can be selected to closely match the shape and size of a particular tooth. Commonly, a band cement is applied to the inner surface of the band immediately before the band is placed on the tooth in order to fill any small voids or crevices between the inner surface of the band and the tooth where food particles might otherwise tend to accumulate and facilitate the formation of caries. The band cement also tends to hinder inadvertent slippage or detachment of the band.

Unfortunately, it has been observed that some bands fail to remain securely affixed to the teeth during the course of orthodontic treatment. A band that has loosened or become detached from the tooth is a nuisance because of the time spent subsequently by the orthodontist for removing any residual cement from the tooth and re-seating the band. If the band becomes detached from the tooth after the patient has left the orthodontist's office, the patient should return to the orthodontist immediately so that the progress of treatment is not unduly hindered.

In the past, a number of attempts have been made to increase the bond strength between the band and the tooth by roughening the inner surface of the band. For example, many orthodontists or their assistants have sandblasted the inner surface of the band by hand in order to roughen the surface and increase the bond strength of the band to the tooth. As another example, European Patent No. 637,945 describes an orthodontic band having an inner surface that is etched by a photoengraving process.

It has also been proposed to roughen the inner surface of other hollow dental articles in order to increase the bond strength between the article and the tooth on which it is placed. For example, the inner surface of a dental crown or bridge can be etched, sandblasted or otherwise roughened in order to hinder separation of the crown or bridge from the bonding adhesive and detachment of the crown or bridge from the underlying prepared tooth structure.

Unfortunately, many of the methods used in the past to process an inner surface of a hollow article are somewhat laborious and time consuming, and do not lend themselves to automated, efficient manufacturing processes. For example, individuals who attempted to sandblast an orthodontic band by hand often grasped the band with tweezers or with his or her fingers and moved either the sandblaster nozzle or the band as needed. In some instances, the sandblasting operation would be momentarily interrupted while the grip of the tweezers or fingers on the band was loosened and moved to a different location on the band, in an attempt to ensure that the entire inner surface was roughened. As can be appreciated, such a method requires considerable effort of the operator in order to ultimately provide a band that has substantially all of its inner surface roughened by the sandblaster. Moreover, a uniform surface roughness using such a method is sometimes difficult to achieve.

Another problem associated with sandblasting orthodontic bands by hand may occur if sand is impacted against the shiny outer surface of the band. Abrasion of the outer surface may facilitate corrosion and cause the band to present an unaesthetic appearance. Accordingly, the operator following the methods known in the past often must devote substantial attention to the sandblasting operation to ensure that the sand is directed only against the inner surface.

SUMMARY OF THE INVENTION

The present invention in one aspect is directed to a method of processing an article that comprises the steps of placing the article in a receptacle of a resilient holder, and rotating the holder about an axis. The method also includes the steps of performing a process operation on a surface of the article while the holder is rotating about the axis, and bending the holder in order to facilitate release of the article from the holder.

Another aspect of the present invention concerns a method of roughening an inner surface of a hollow dental article that comprises the steps of placing the article in a recess of a resilient holder, and rotating the holder about an axis. The method further includes the steps of roughening an inner surface of the article while the holder is rotating about the axis, and bending the holder in order to facilitate release of the article from the holder.

The present invention also is directed to a method of processing an article that comprises the steps of directing a quantity of flowable material to a first surface of a replica of the article, and hardening the flowable material to make a holder for the article. The method also includes the steps of detaching the replica from the holder to thereby present an article-receiving receptacle, and placing an article in the receptacle. A process operation is performed on a second surface of the article while a first surface of the article that is similar in shape to the first surface of the replica is substantially masked by the holder.

The resilient holder is an advantage, in that the article is securely retained in the holder during intermediate process steps without damage to the outer surface of the article. Moreover, a number of such holders can be inexpensively made for mounting articles having different configurations. The method is highly compatible with automated manufacturing processes and can be carried out if desired with little operator attention.

DETAILED DESCRIPTION OF THE PREFERRED EMBODIMENTS

Figure 1:
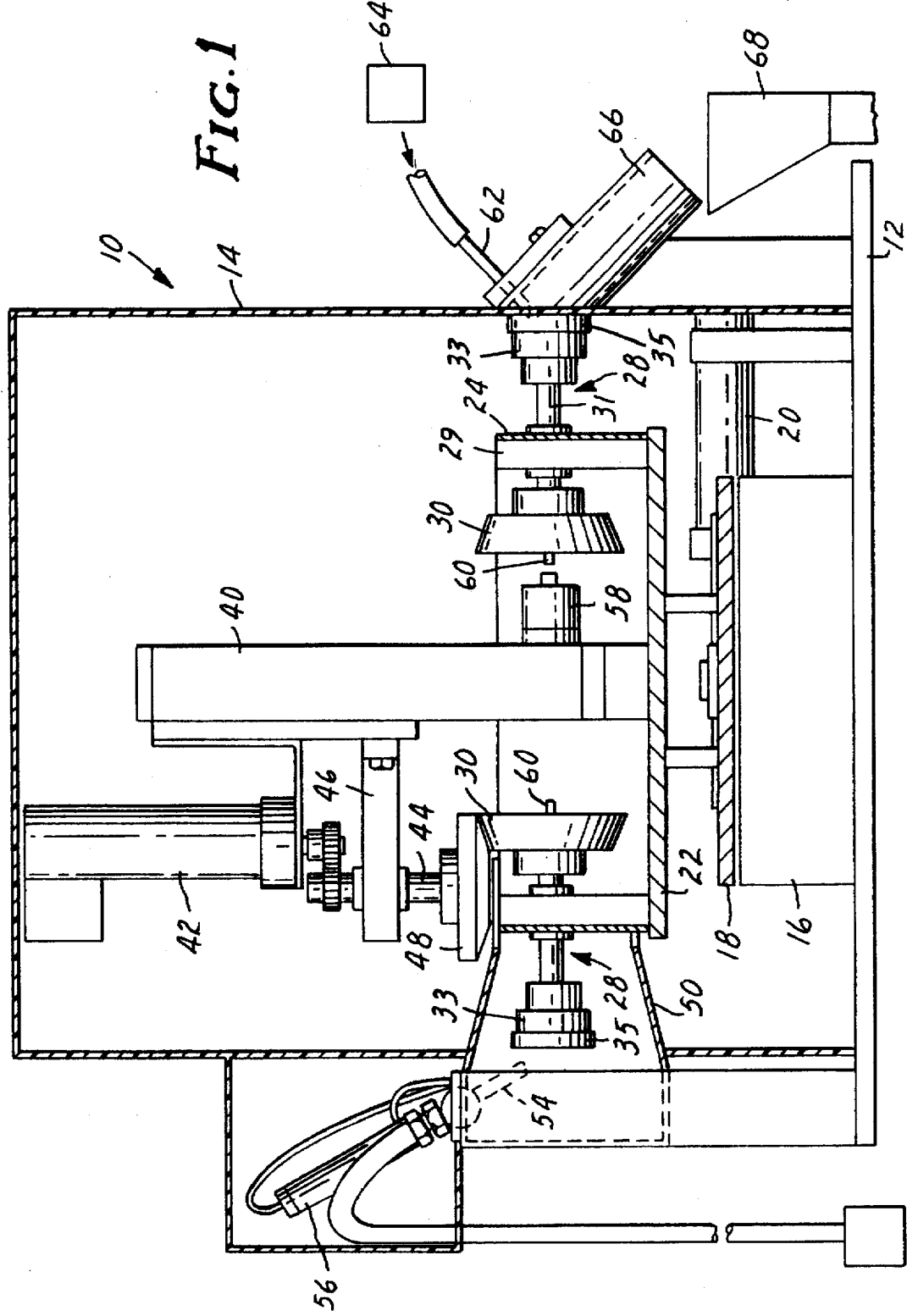
FIG. 1 is a fragmentary, side elevational view in partial section of an apparatus folding an article such as an orthodontic band during manufacture according to one embodiment of the invention.
Figure 2:
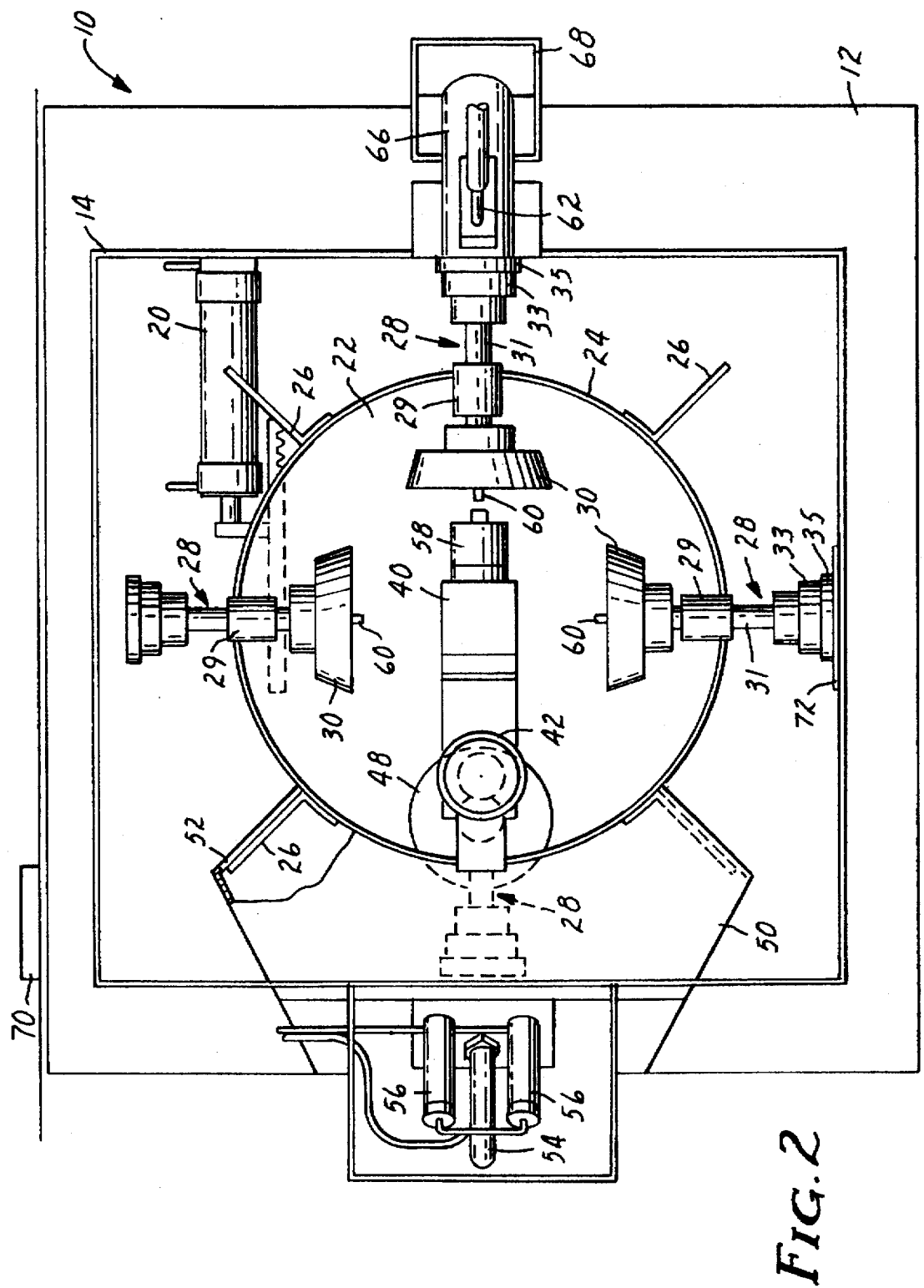
FIG. 2 is a plan view of the apparatus shown in FIG. 1.

An apparatus for processing an inner surface of a hollow article is broadly designated by the numeral 10 in FIGS. 1 and 2. The apparatus 10 includes a flat, horizontally extending base 12 and a box-like enclosure 14 that extends upwardly from the base 12. The enclosure 14 is preferably made of a rigid, clear plastic material such as "PLEXIGLAS" brand thermoplastic polymer. Although not shown, the enclosure 14 is preferably provided with hinged doors to facilitate access to various components of the apparatus 10.

A rotary indexer (model no. 11EA-4; from Allenair) includes a gear box 16 (see FIG. 1) that extends upwardly from the base 12. The gear box 16 is coupled to a rotary table 18. The rotary indexer also includes a rack and pinion drive 20 that is mounted on the base 12 and is coupled to the table 18 in order to turn the table 18 about a horizontal arc in increments of ninety degrees when desired.

A number of risers extend upwardly from the table 18 and are connected to a horizontally extending platform 22 that is parallel to and overlies the table 18. A cylindrical wall 24 made of sheet metal is fixed to the platform 22 and extends upwardly from the latter. As illustrated in FIG. 2, four paddles 26 are connected to an outer surface of the wall 24 and extend outwardly in equally spaced apart, radial fashion from the vertical axis of rotation of the platform 22 and the rotary table 18.

Four arbor assemblies 28 are supported by upright bearing blocks 29 fixed to the platform 22. The arbor assemblies 28 extend through respective, spaced apart holes in the wall 24 at locations midway between adjacent pairs of the paddles 26. Each arbor assembly 28 includes an elongated, hollow shaft 31 that is rotatable about a horizontal axis. A beveled steel drive wheel 30 is fixedly connected to the inner end of the shaft 31 of each arbor assembly 28.

Figure 5:
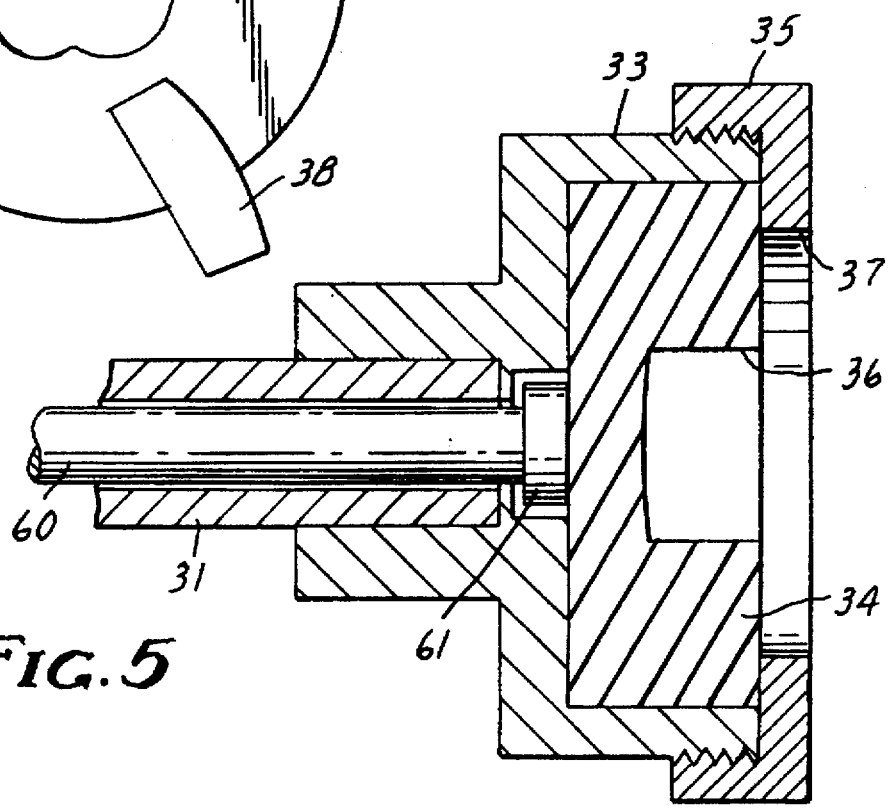
FIG. 5 is a fragmentary, side cross-sectional view of the holder shown in FIGS. 3 and 4 along with a mounting fixture and a movable rod for facilitating release of the article from the holder.

The opposite, or outer end of each shaft 31 carries a mounting fixture that is shown in more detail in FIG. 5. The mounting fixture includes a spindle 33 having a cylindrical cavity and an externally threaded wall surrounding the cavity. A spindle ring 35 has internal threads that are releasably coupled to the mating, threaded wall of the spindle 33, and also has a circular central opening 37 next to the cavity. The spindle ring 35 serves as a cap or cover to releasably retain a resilient article holder 34 in the cavity.

Figure 4:
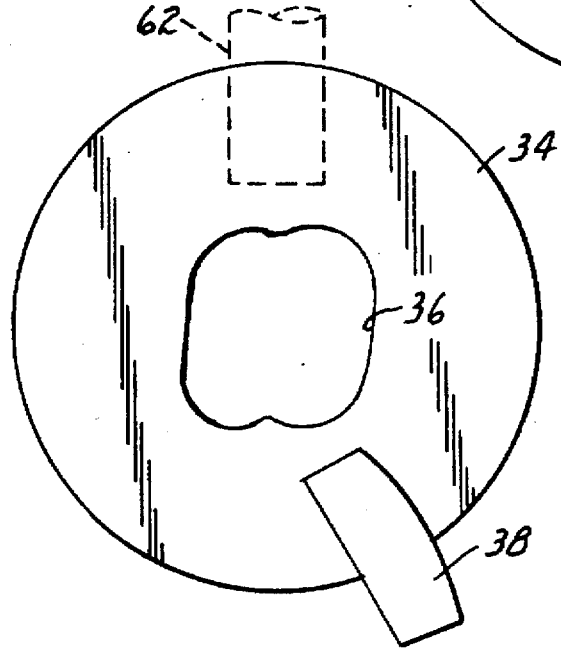
FIG. 4 is a front elevational view of the holder illustrated in FIG. 3, except that the holder has been moved to a location adjacent a pressurized air nozzle (shown in dashed lines) in order to facilitate release of the article from the holder.

The holder 34 is also illustrated in FIGS. 4–5 and has an overall cylindrical shape. The holder 34 includes a central article-receiving receptacle or recess 36 located on a vertical face of the holder 34 that faces away from the axis of rotation of the table 18. The recess 36 preferably has a depth in a horizontal direction viewing FIG. 5 that is at least as great as the depth of the article to be received.

Preferably, the holder 34 is molded of an initially flowable material that is formed during manufacture in a manner such that the recess 36 has a shape that is complemental to the outer configuration of the article to be retained in the recess 36. By way of example, the side wall of the recess 36 as shown in the drawings is complemental in configuration to a first surface of an orthodontic band 38 as can be appreciated by reference to FIG. 3. The holder 34 including the recess 36 is made by directing a quantity of the flowable material around a replica of the band 38 in order to fully contact a first, outer surface of the replica, and then curing, cooling or otherwise causing or allowing the flowable material to harden to a more rigid condition.

The replica is made by filling the inner space of a sample band with a quantity of hardenable filling composition (such as "DEVCON POLYSTRATE 5-MINUTE" brand epoxy, no. 14270, from ITW Devcon). Optionally, a handle (such as a screw) is placed in the middle of the band and within the filling composition before it hardens. The handle is then used to hold the filled band in the center of a molding container as the flowable material is placed around the peripheral surface of the band. Preferably, at least four identical holders 34 are made for each different band, so that each mounting fixture can receive an identical holder 34 when the apparatus 10 is in use.

The holder 34 is made of a material such as silicone rubber that, when hardened, exhibits flexibility, resilience, elasticity and inherent memory. A preferred holder 34 is made by mixing ten parts by weight of RTV 700 molding material with one part by weight of Beta 1 catalyst (both from General Electric) and then pouring the molding material into the molding container and around the replica before the material hardens.

The apparatus 10 includes a center post 40 (FIGS. 1–2) that is affixed to an upstanding, L-shaped bracket (not shown) connected to one side of the base 12 spaced from the platform 22. A bracket is connected to one side of the post 40 and carries a motor 42. The output shaft of the motor 42 is connected to a gear that meshes with another gear that is fixed to the upper end of a drive shaft 44 (FIG. 1).

The drive shaft 44 is rotatably supported by a bearing block that is mounted on an outer end of a horizontal arm 46. The arm has an inner end that is fixed to the center post 40. A lower end of the drive shaft 44 is connected to a drive wheel 48 having a lowermost, synthetic rubber, beveled portion for frictional engagement with the drive wheel 30 of the currently underlying arbor assembly 28.

A sandblasting housing 50 is connected to the base 12, and includes two rectangular openings 52 (see FIG. 2) on each side that permit passage of the paddles 26 as the table 18 is rotated. The housing 50 is sufficiently large to enclose the arbor assembly 28 that is currently in a "processing" or "sandblasting" position beneath the drive wheel 48. An outer portion of the housing 50 extends outwardly from the enclosure 14, and has an upper opening that permits passage of a sandblasting nozzle 54 into the space within the housing 50.

The upper end of the sandblasting nozzle 54 is fixed to a movable bracket that is also connected to the pistons of two double acting, air actuated piston and cylinder assemblies 56. The cylinders of the assemblies 56 are secured to another bracket that is fixed to the housing 50. When the pistons of the assemblies 56 are retracted, the lower end of the sandblasting nozzle 54 is moved to a location closely adjacent the holder 34 and the band 38. Extension of the pistons moves the sandblasting nozzle 54 upwardly along an inclined path in a direction away from the holder 34 and the band 38.

An example of a suitable grit for roughening the inner surface of the band 38 is 150 grit aluminum oxide. A suitable sandblasting apparatus is sold under the trademark "SWAM-BLASTER" (from Crystal Mark, Inc.). Suitable settings for using the aforementioned SWAM-BLASTER sandblaster include an air pressure of 40±5 psi with a vibrator voltage of about 60±5.

The housing 50 encloses the sandblasting operation in order to reduce the emission of dust-laden air into the atmosphere. Preferably, a dust collector (such as "MECO" brand dust collector, model 33.5) is connected by a flexible duct to the housing 50 in order to remove particulate matter from air exhausted from within the housing 50. The paddles 26 serve to substantially block the openings 52 that are provide for enabling movement of the arbor assemblies 28 into the housing 50 as the table 18 is rotated.

Another air actuated piston and cylinder assembly 58 is mounted on a side of the center post 40 that is opposite the location of the housing 50. When the piston of the piston and cylinder assembly 58 is extended, it contacts the inner end of a rod 60 located within the hollow shaft of the adjacent arbor assembly 28 that is currently located in an "unloading station". The unloading station is located on the right-hand side of FIGS. 1 and 2. Each of the arbor assemblies 28 includes a similar rod 60 as can be observed by viewing FIG. 2.

When the piston of the piston and cylinder assembly 58 is extended and contacts the rod 60, the rod 60 slides within the shaft of the arbor assembly 28 in a direction radially outwardly from the axis of rotation of the table 18. The outer end of the rod 60 is shown in FIG. 5 and includes an enlarged pusher or head 61. The head 61 is located near the holder-receiving cavity and next to the center of an inner face of the holder 34. When the rod 60 moves radially outwardly, the head 61 pushes on the inner face of the holder 34 to cause the holder 34 to flex outwardly toward a bulged, convex configuration. As the holder 34 is deformed in such a fashion, the side wall of the recess 36 on the outer face of the holder 34 spreads outwardly and loosens its grip on the band 38.

Figure 3:
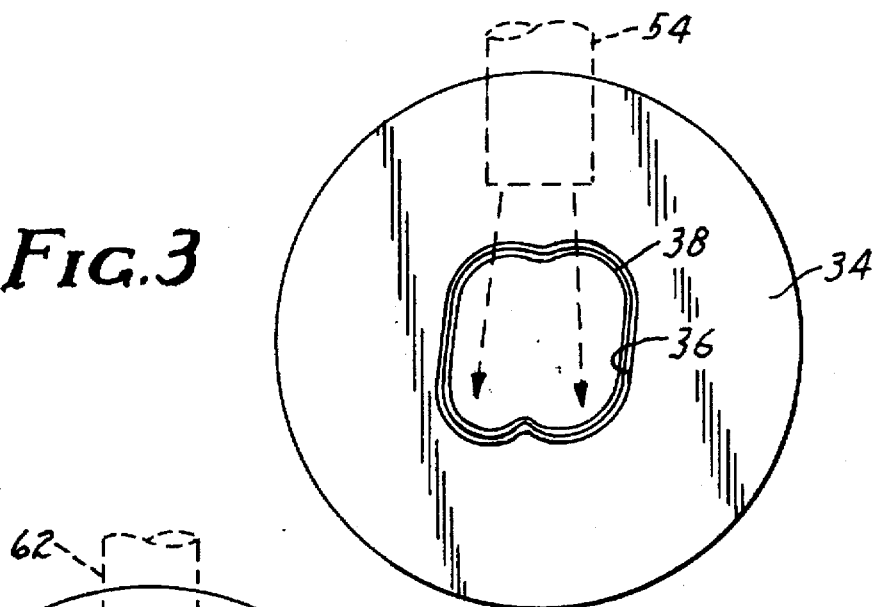
FIG. 3 is an enlarged front elevational view of a holder of the apparatus depicted in FIGS. 1 and 2, wherein a hollow article placed in a recess of the holder has been moved to a location adjacent a sandblaster nozzle that is shown in dashed lines.

A pressurized air nozzle 62 is illustrated in FIGS. 2 and 3 and has an outlet end that is close to the recess 36 of the holder 34 currently located in the unloading station. The nozzle 62 is connected to a source of pressurized air 64 (shown schematically in FIG. 1) that is operable to provide an intermittent blast of pressurized air to the nozzle 62 when desired. As shown in FIG. 1, the nozzle 62 extends downwardly in a direction toward the recess 36 of the adjacent holder 34.

A discharge chute 66 for bands 38 ejected from the holders 34 has an inlet end that surrounds an opening of the enclosure 14. The opening also surrounds the holder 34 that is located in the unloading station. The pressurized air nozzle 62 passes through an upper end of the discharge chute 66 and extends in a downwardly inclined direction toward the center of that holder 34. A collection hopper 68 is located beneath a lower, outlet end of the discharge chute 66 to temporarily hold the bands 38 ejected from the holders 34 until gathered for one or more subsequent processing operations, such as cleaning and packaging.

The apparatus 10 also includes a programmable controller 70 (such as SLC-500 programmable controller; Allen Bradley) that is shown schematically in FIG. 2. The controller 70 is electrically connected to and thus controls operation of the drive 20, the motor 42, the sandblaster and the source of pressurized air 64. The controller 70 is also electrically connected to and thus controls operation of solenoid air valves (not shown) that serve to control movement of the pistons of the piston and cylinder assemblies 56 and 58.

A loading station includes an opening in one of the four upright walls of the enclosure 14 and is shown at the bottom of the drawing in FIG. 2. That opening is covered by a flexible diaphragm 72 made, for example, of a section of a paperboard sheet. The diaphragm 72 has an opening positioned to expose the outer face of the holder 34 and enable access to the recess 36 so that a band such as band 38 can be inserted in the recess 36 without a need for opening an access door or the like to the enclosure 14.

Operation

In use of the apparatus 10, an operator places a hollow article such as band 38 through the opening of the diaphragm 72 and into the recess 36 of the holder 34 that is presently located at the loading station. Optionally, the outer face of the holder 34 has an identifying mark or some type of indicia located near one side of the recess 36 to enable the operator to quickly and correctly orient the band 38 relative to the recess 36. As a result, the sides of the recess 36 complementally engage and thus mask the entire outer surface of the band 38. As an example, the identifying mark on the holder 34 may be oriented relative to a manufacturer's identifying mark (such as a size, tooth type or catalog number) that has been previously placed on the band 38.

Next, the operator presses an electric switch connected to the controller 70, and the controller 70 then actuates the rack and pinion drive 20 to turn the table 18 ninety degrees in a clockwise direction viewing FIG. 2. As the holder 34 moves away from the loading station, the spindle ring 35 pushes against the flexible diaphragm 72, whereupon the diaphragm 72 deflects slightly in a direction away from the table's axis of rotation to enable the holder 34 to pass.

Once the table 18 has turned ninety degrees, the holder 34 grasping the band 38 is now located within the sandblasting housing 50, and the paddles 26 adjacent either side of that holder 34 are in a position to close the openings of the housing 50. In addition, as the arbor assembly supporting such holder 34 moves to the sandblasting station, the drive wheel 30 comes into contact with the drive wheel 48 and the motor 42 (which optionally is running continuously) causes the shaft of the arbor assembly 28 to rotate.

Next, the controller 70 actuates the electric air solenoids coupled to the piston and cylinder assemblies 56 in order to cause the pistons of the assemblies 56 to retract and move the sandblasting nozzle 54 downwardly a distance of about 1 in. (2.5 cm) toward the band 38. Once the sandblasting nozzle 54 has retracted, the controller 70 actuates the sandblaster for a time period of about three seconds, during which time the holder 34 rotates about five revolutions. The sandblasting operation roughens the entire area of the inner surface of the band 38.

Subsequently, the controller 70 actuates the electric air solenoid connected to the piston and cylinder assemblies 56 to extend the pistons and raise the sandblasting nozzle 54. When the operator depresses the switch again (as would occur once a band has been loaded into the following holder 34) the controller then operates the drive 20 to move the table 18 another ninety degrees in a clockwise direction viewing FIG. 2. As a consequence, the holder 34 carrying the sandblasted band is brought to a holding station that is shown at the top of FIG. 2.

As the table 18 rotates and moves the holder 34 carrying the sandblasted band 38 toward the holding station, the drive wheel 30 of the corresponding arbor assembly 28 disengages the drive wheel 48 and the shaft of the arbor assembly 28 comes to rest. Once the holder 34 reaches the holding station, that holder 34 temporarily waits while a sandblasting operation is carried out on the band supported by the holder 34 immediately following.

Next, and upon depression again of the switch, the controller 70 operates the drive 20 to turn the table 18 another ninety degrees in a clockwise direction viewing FIG. 2. Such movement brings the holder 34 that was previously located at the holding station to the unloading station. The controller 70 then actuates the air solenoid connected to the piston and cylinder assembly 58 in order to extend the piston of the assembly 58 and thereby move the rod 60 in a radially outward direction, or toward the right-hand side of FIG. 2.

As the rod 60 is extended, the head 61 contacts the holder 34 and pushes the center of the holder 34 outwardly. Simultaneously, the controller 70 actuates the pressurized air source 64 in order to direct a stream of pressurized air through the nozzle 62 and toward the band 38. The pressurized air stream helps to dislodge the band 38 from the recess 36 while the holder 34 is deformed, such that the band 38 falls from the recess 36 as shown in FIG. 4 and slides down the discharge chute 66 to the collection hopper 68.

The controller 70 then interrupts the flow of air to the piston and cylinder assembly 58. The inherent memory of the holder 34 causes the holder 34 to return to its normal configuration and also pushes the rod 60 in a radially inward, or return, direction. When the operator next presses the switch, the controller 70 causes the drive 20 to turn the table 18 another ninety degrees in order to bring the empty holder 34 back to the loading station so that the foregoing cycle may be repeated.

As can be appreciated, use of the rotary table 18 enables a band to be loaded into one holder 34 at approximately the same time that another band is sandblasted, and while a third band is ejected from its respective holder 34. Thus, the loading, sandblasting and ejection steps can be carried out essentially simultaneously, and the operator at the loading station can oversee the sandblasting and unloading steps as well. The use of the enclosure 14 and the housing 50 along with other components such as the dust collector, the paddies 26 and the flexible diaphragm 72 enable the operator to work in a relatively dust-free environment.

Those skilled in the art can recognize that the method described herein is also useful for other process operations such as painting, etching (including chemical etching, photoetching or otherwise), treating, coating or otherwise processing various surfaces of articles. Furthermore, more than one process operation can be carried out on a selected surface of an article. For example, the inner surface could be sandblasted at the sandblasting station and subsequently coated with an adhesive or adhesive primer while the holder is located at the holding station mentioned above.

The apparatus 10 is also useful for a variety of articles other than orthodontic bands, such as dental crowns and bridges and other items having a surface to be processed. Additionally, the apparatus 10 can also be used in connection with articles that are not hollow such as orthodontic brackets. For example, one portion of the brackets (such as the visible portion of the brackets when affixed to the patient's teeth) could be received in a recess of the holder, while a second portion of the brackets (such as the tooth facing surfaces) could be exposed for sandblasting or other treatment. Moreover, the holder could have a protruding article-receiving receptacle such as a post (instead of a recess) that is adapted to fit within an inner space of an article while a process operation is carried out on its outer surface. Advantageously, the use of the flowable material to make the holder 34 enables the apparatus to be used with a variety of articles having differing shapes, since the holder can be custom-made to fit the selected article as desired.

Those skilled in the art will also recognize that a number of modifications, additions and changes may be made to the methods set out above in the detailed description of our presently preferred embodiments. Accordingly, the invention should not be deemed limited by the description set out above, but only by a fair scope of the claims that follow along with their equivalents.

We claim:

1. A method of processing an article comprising the steps of:

directing a quantity of flowable material to a first surface of a replica of the article;

hardening the flowable material to make a resilient holder for the article;

detaching the replica from the holder to thereby present an article-receiving receptacle;

coupling the holder to a mounting fixture;

placing the article in the receptacle of the holder;

rotating the mounting fixture and thereby the holder about an axis;

performing a process operation on a second surface of the article while the holder is rotating about the axis and while a first surface of the article that is similar in shape to the first surface of the replica is substantially masked by the holder; and advancing a pusher toward the holder to push the holder while the holder remains coupled to the mounting fixture in order to bend the holder and facilitate release of the article from the holder.

2. A method of processing an article comprising the steps of:

forming a receptacle of a resilient holder by placing a replica of the article in contact with the holder as the holder is made;

placing the article in the receptacle of the holder;

rotating the holder about an axis;

performing a process operation on a surface of the article while the holder is rotating about the axis; and advancing a pusher toward the holder to push the holder at a location spaced from the article in order to bend the holder and facilitate release of the article from the holder.

3. The method of claim 1, wherein said step of forming the receptacle includes the steps of directing a quantity of flowable material around the replica and then hardening the flowable material.

4. The method of claim 3, wherein said flowable material is a synthetic rubber.

5. The method of claim 1 including the step of mounting a number of holders on a turntable.

6. The method of claim 1 wherein said step of advancing a pusher includes the step of pushing the holder on a side of the holder opposite the receptacle.

7. A method of processing an article comprising the steps of:

placing the article in a receptacle of a resilient holder;

rotating the holder about an axis;

performing a process operation on a surface of the article while the holder is rotating about the axis;

bending the holder in order to facilitate release of the article from the holder; and directing a stream of pressurized fluid toward the holder to facilitate releasing the article from the holder.

8. The method of claim 1, wherein said article is a hollow dental article.

9. A method of roughening an inner surface of a hollow dental article comprising the steps of:

placing the article in a recess of a resilient holder;

rotating the holder about an axis;

roughening an inner surface of the article while the holder is rotating about the axis; and advancing a pusher toward the holder to push the holder at a location spaced from the article in order to bend the holder and facilitate release of the article from the holder.

10. The method of claim 9, wherein said step of roughening an inner surface of the article includes the step of eroding away at least part of the inner surface.

11. The method of claim 10, wherein said step of eroding away at least part of the inner surface includes the step of sandblasting the inner surface.

12. The method of claim 10 and including the step of moving a nozzle toward the article in order to facilitate roughening the inner surface of the article.

13. The method of claim 9 including the step of mounting a number of holders on a turntable.

14. The method of claim 9 wherein said step of advancing a pusher includes the step of pushing the holder on a side of the holder opposite the recess.

15. A method of roughening an inner surface of a hollow dental article comprising the steps of:

placing the article in a recess of a resilient holder;

rotating the holder about an axis;

roughening an inner surface of the article while the holder is rotating about the axis;

bending the holder in order to facilitate release of the article from the holder; and directing a stream of pressurized fluid toward the holder to facilitate releasing the article from the holder.

16. The method of claim 1 wherein said step of pushing the holder includes the step of advancing a pusher toward the holder to push the holder at a location spaced from the article.

17. A method of processing an article comprising the steps of:

directing a quantity of flowable material to a first surface of a replica of the article;

hardening the flowable material to make a holder for the article;

detaching the replica from the holder to thereby present an article-receiving receptacle;

placing the article in the receptacle of the holder;

performing a process operation on a second surface of the article while a first surface of the article that is similar in shape to the first surface of the replica is substantially masked by the holder;

bending the holder in order to facilitate release of the article from the holder; and directing a stream of pressurized fluid toward the holder to facilitate releasing the article from the holder.

18. The method of claim 1, wherein said article is a hollow article, said first surface is an inner surface and said second surface is an outer surface.

19. The method of claim 1, wherein said article is a dental article, and wherein said process operation comprises a surface roughening operation.

20. The method of claim 19 and including the step of moving a nozzle toward the article in order to facilitate roughening the surface of the article.

21. The method of claim 1 including the step of mounting a number of holders on a turntable.

22. The method of claim 19 and including the step of moving the holder while said step of performing a process operation is carried out.

23. The method of claim 1, wherein said receptacle is a recess.

* * * * *

UNITED STATES PATENT AND TRADEMARK OFFICE
CERTIFICATE OF CORRECTION

PATENT NO.: 5,716,257

DATED: February 10, 1998

INVENTOR(S): Ernest Gallo, Terrance E. Wick and Francisco M. Nuno

It is certified that error appears in the above-identified patent and that said Letters Patent is hereby corrected as shown below:

Col. 8, line 53, "The method of claim 1" should read --The method of claim 2--.

Col. 9, line 7, "The method of claim 1" should read --The method of claim 2--.

Signed and Sealed this

Twenty-fourth Day of November, 1998

Attest:

BRUCE LEHMAN

Attesting Officer   Commissioner of Patents and Trademarks